United States Patent
McGuire et al.

(10) Patent No.: US 11,472,098 B2
(45) Date of Patent: Oct. 18, 2022

(54) PROTECTIVE LAYERS FOR DRY APPLICATION TO PROTECTED SURFACES, INSTALLATION ASSEMBLIES AND KITS INCLUDING THE LAYERS, DEVICES PROTECTED WITH THE LAYERS, AND ASSOCIATED METHODS

(75) Inventors: James McGuire, Columbus, OH (US); Robert G. Pedersen, II, Holladay, UT (US); Derek M. Smith, Alpine, UT (US); John W. Melville, Salt Lake City, UT (US); Brian S. Packer, Crecora (IE)

(73) Assignee: ZAGG Inc, Midvale, UT (US)

( * ) Notice: Subject to any disclaimer, the term of this patent is extended or adjusted under 35 U.S.C. 154(b) by 811 days.

(21) Appl. No.: 13/166,745

(22) Filed: Jun. 22, 2011

(65) Prior Publication Data
US 2012/0087072 A1   Apr. 12, 2012

Related U.S. Application Data

(60) Provisional application No. 61/357,427, filed on Jun. 22, 2010, provisional application No. 61/357,972, filed on Jun. 23, 2010.

(51) Int. Cl.
*B32B 27/08* (2006.01)
*B29C 63/02* (2006.01)
*B29C 63/00* (2006.01)
*B32B 27/30* (2006.01)
*B32B 27/28* (2006.01)
(Continued)

(52) U.S. Cl.
CPC .......... *B29C 63/02* (2013.01); *B29C 63/0047* (2013.01); *B32B 7/06* (2013.01);
(Continued)

(58) Field of Classification Search
CPC .. B32B 7/12; B32B 7/04; B32B 7/045; B32B 7/06; B32B 7/00; B32B 3/02; B32B 5/14;
(Continued)

(56) References Cited

U.S. PATENT DOCUMENTS 3,971,691 A   7/1976   Cairns
3,987,569 A   10/1976   Chase
(Continued)

FOREIGN PATENT DOCUMENTS

JP     2002-297041 A     10/2002
KR   1020050093046 A      9/2005
(Continued)

OTHER PUBLICATIONS

Edward M. Petrie, SpecialChem, 2003.*
(Continued)

*Primary Examiner* — Callie E Shosho
*Assistant Examiner* — Krupa Shukla
(74) *Attorney, Agent, or Firm* — Dentons Durham Jones Pinegar

(57) ABSTRACT

A protective film includes an adhesive material configured for "dry" application to a surface that is to be protected, such as the surface of an electronic device. An installation assembly that includes the protective film is configured to minimize or eliminate contact with the protective film as it is applied to the surface that is to be protected. Methods for manufacturing a protective film and an installation assembly that includes the protective film may be effected in contaminant-free conditions. Methods for applying the protective film are also disclosed, as are device (e.g., electronic devices, etc.) with at least one surface covered with a protective film.

46 Claims, 5 Drawing Sheets

(51) Int. Cl.

| | | |
|---|---|---|
| B32B 25/20 | (2006.01) | |
| B32B 27/36 | (2006.01) | |
| B32B 27/32 | (2006.01) | |
| C09J 7/29 | (2018.01) | |
| B32B 27/40 | (2006.01) | |
| B32B 7/06 | (2019.01) | |
| B32B 7/12 | (2006.01) | |
| B32B 25/08 | (2006.01) | |
| G06F 1/16 | (2006.01) | |
| H04M 1/18 | (2006.01) | |

(52) U.S. Cl.
CPC ............... *B32B 7/12* (2013.01); *B32B 25/08* (2013.01); *B32B 25/20* (2013.01); *B32B 27/08* (2013.01); *B32B 27/283* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *C09J 7/29* (2018.01); *B29C 2063/027* (2013.01); *B32B 2307/406* (2013.01); *B32B 2307/41* (2013.01); *B32B 2307/412* (2013.01); *B32B 2307/414* (2013.01); *B32B 2307/732* (2013.01); *B32B 2571/00* (2013.01); *C09J 2301/162* (2020.08); *C09J 2475/006* (2013.01); *G06F 1/1626* (2013.01); *G06F 1/1656* (2013.01); *H04M 1/18* (2013.01); *Y10T 428/1405* (2015.01); *Y10T 428/1471* (2015.01); *Y10T 428/1476* (2015.01); *Y10T 428/24322* (2015.01); *Y10T 428/2848* (2015.01)

(58) Field of Classification Search
CPC ......... B32B 17/00; B32B 27/32; B32B 27/36; B32B 2037/12; B32B 2037/268; B32B 2250/00; B32B 2405/00; B32B 2519/00; B32B 2457/20; B32B 27/06; B29C 2063/027; B29C 63/0047; B29C 63/02; B29C 63/00; B81C 1/00349; B81C 1/00357; C09J 2201/162; C09J 2475/006; C09J 7/0296; C09J 5/00; C09J 7/00; C09J 7/0225; G09F 2003/0272; G09F 2003/0273; G09F 2003/0275; G09F 1/00; G09F 3/00; G09F 3/10; G06F 1/1626; G06F 1/1656
USPC .... 428/41.7, 41.8, 41.9, 42.1, 42.2, 98, 101, 428/102, 317.3, 332, 334, 343, 354, 352, 428/40.1, 423.1, 424.2, 424.8, 68, 1.61, 428/43, 426, 40.2; 156/60, 502, 507, 156/701, 247, 283, 284, 182, 249; 427/208.4, 258, 265; 361/679.01; 283/100, 101, 107, 81; 40/299.01, 625, 40/638; 160/130
See application file for complete search history.

(56) References Cited

U.S. PATENT DOCUMENTS

| | | |
|---|---|---|
| 4,026,485 A | 5/1977 | Ambrose |
| 4,119,332 A | 10/1978 | Merrill |
| 4,709,695 A | 12/1987 | Kohn et al. |
| RE33,353 E | 9/1990 | Heinecke |
| 5,419,666 A | 5/1995 | Best |
| 5,498,455 A | 3/1996 | Roberts |
| 5,520,629 A * | 5/1996 | Heinecke et al. ............ 602/57 |
| 5,888,335 A * | 3/1999 | Kobe et al. ............... 156/306.3 |
| 5,951,054 A * | 9/1999 | Hagen et al. ............... 283/81 |
| 6,008,429 A | 12/1999 | Ritger |
| 6,129,929 A | 10/2000 | Wick |
| 6,159,497 A | 12/2000 | LaPrade et al. |
| 6,613,411 B2 | 9/2003 | Kollaja et al. |
| 6,700,033 B1 * | 3/2004 | Marcussen et al. ............ 602/57 |
| 6,733,863 B1 | 5/2004 | Mizuno |
| 6,758,000 B2 * | 7/2004 | Sandt et al. .................... 40/300 |
| D578,164 S | 10/2008 | Ingle |
| D658,164 S | 4/2012 | Chan |
| 8,333,408 B2 | 12/2012 | Flynn et al. |
| 8,594,755 B1 | 11/2013 | Tages et al. |
| 8,640,759 B2 | 2/2014 | Chen |
| 8,655,481 B2 | 2/2014 | Sheu |
| D708,804 S | 7/2014 | Piro |
| 8,923,937 B2 | 12/2014 | Tages et al. |
| D727,330 S | 4/2015 | Reaux |
| D734,311 S | 7/2015 | Takamoto et al. |
| 9,120,954 B2 | 9/2015 | Feller |
| 9,192,086 B2 | 11/2015 | Hsu et al. |
| 9,248,634 B2 | 2/2016 | Cohen et al. |
| 9,777,195 B2 | 10/2017 | Colby et al. |
| 9,918,418 B2 | 3/2018 | Chou |
| 2001/0053648 A1 | 12/2001 | Furukawa et al. |
| 2003/0082327 A1 | 5/2003 | Pearson et al. |
| 2004/0137249 A1 * | 7/2004 | Kamiyama ............ B32B 27/36 428/483 |
| 2004/0170817 A1 | 9/2004 | Fox |
| 2004/0246386 A1 * | 12/2004 | Thomas et al. ............... 348/818 |
| 2005/0087977 A1 * | 4/2005 | Crum ............................ 283/62 |
| 2005/0116334 A1 * | 6/2005 | Buehler ...................... 257/704 |
| 2005/0168697 A1 | 8/2005 | Bruzzone |
| 2006/0062953 A1 | 3/2006 | Trigg et al. |
| 2006/0186001 A1 * | 8/2006 | Anderson et al. ............ 206/320 |
| 2006/0262405 A1 * | 11/2006 | Brumwell .............. G02B 1/105 359/588 |
| 2008/0099152 A1 | 5/2008 | Nakamura |
| 2009/0075006 A1 * | 3/2009 | Lynam et al. ............... 428/40.1 |
| 2009/0186181 A1 | 7/2009 | Mase |
| 2009/0186198 A1 * | 7/2009 | McGuire, Jr. ............ B44C 1/105 428/195.1 |
| 2009/0301907 A1 | 12/2009 | Mason |
| 2009/0313902 A1 | 12/2009 | Brisbois et al. |
| 2010/0092713 A1 | 4/2010 | Bullard et al. |
| 2010/0098942 A1 | 4/2010 | Stachnik et al. |
| 2010/0264566 A1 | 10/2010 | Moore et al. |
| 2011/0267793 A1 | 11/2011 | Cohen et al. |
| 2011/0293870 A1 | 12/2011 | Lin et al. |
| 2012/0008269 A1 | 1/2012 | Gengler |
| 2012/0057287 A1 | 3/2012 | Chaves et al. |
| 2012/0064318 A1 | 3/2012 | Keite-Telgenbüscher et al. |
| 2013/0295310 A1 | 11/2013 | Tages et al. |
| 2013/0296004 A1 | 11/2013 | Tages et al. |
| 2014/0130971 A1 | 5/2014 | Wu et al. |
| 2014/0139991 A1 | 5/2014 | Gengler |
| 2014/0230988 A1 | 8/2014 | Chou |
| 2015/0169089 A1 | 6/2015 | Dixon et al. |
| 2015/0246514 A1 | 9/2015 | LaColla et al. |
| 2015/0273786 A1 | 10/2015 | Ozeki |
| 2015/0370288 A1 | 12/2015 | Dinesh |
| 2018/0117874 A1 | 5/2018 | Rothbauer et al. |
| 2018/0350641 A1 | 12/2018 | Nakamura et al. |

FOREIGN PATENT DOCUMENTS

| | | |
|---|---|---|
| KR | 1020060022825 A | 3/2006 |
| KR | 1020060022952 A | 3/2006 |
| KR | 1020060094268 A | 8/2006 |
| WO | WO 0152223 A2 * | 7/2001 |

OTHER PUBLICATIONS

Eclometer Instruments, 2006.*
International Searching Authority—U.S. "International Search Report and Written Opinion" Issued in corresponding PCT application No. PCT/US2011/041525 dated Jan. 11, 2012.

* cited by examiner

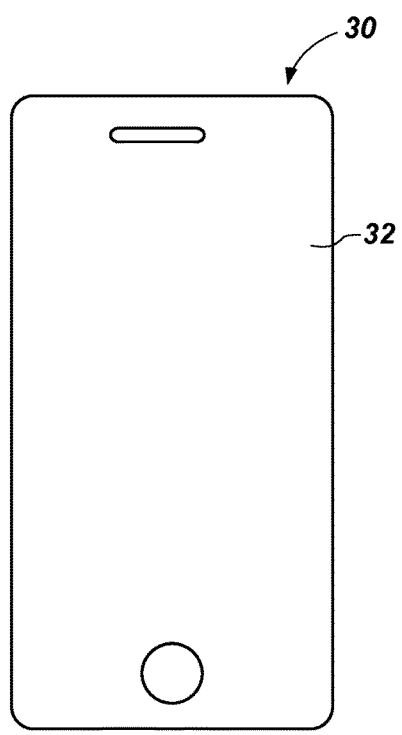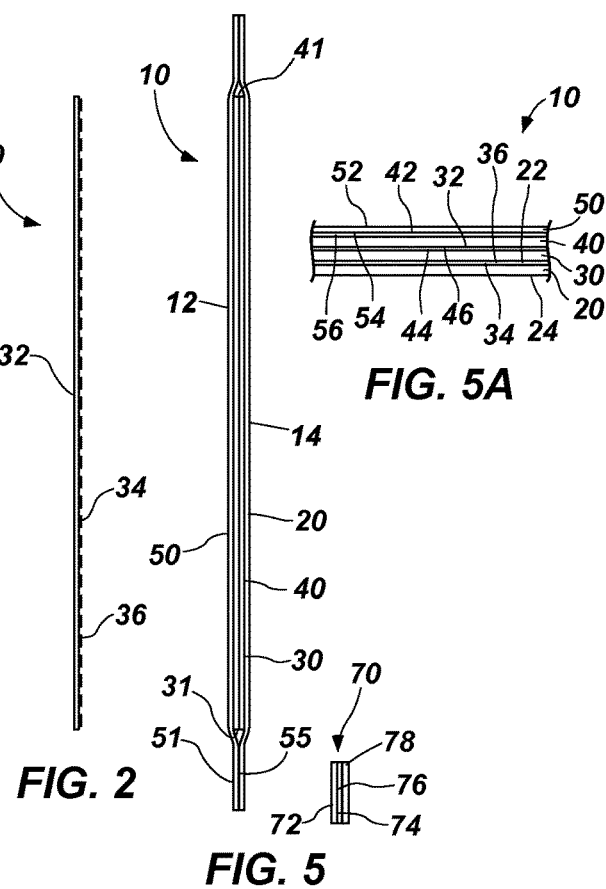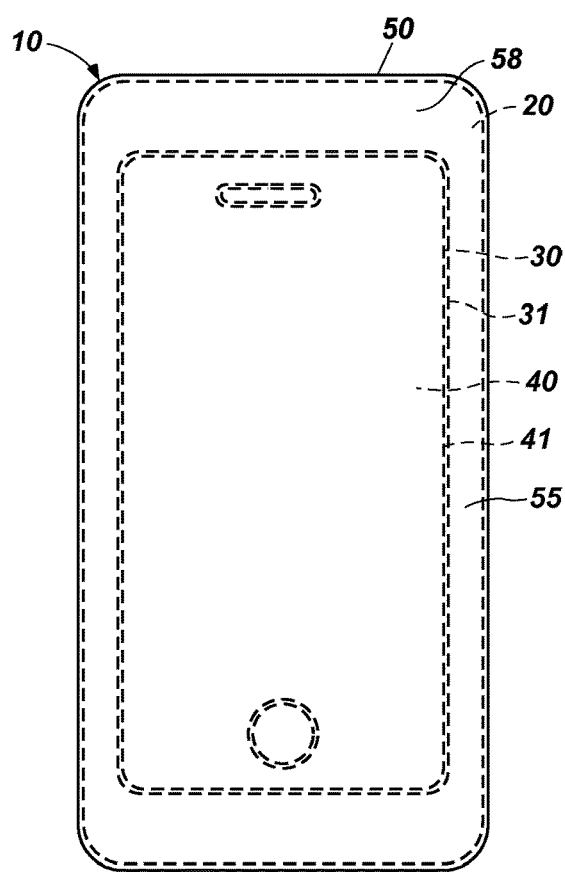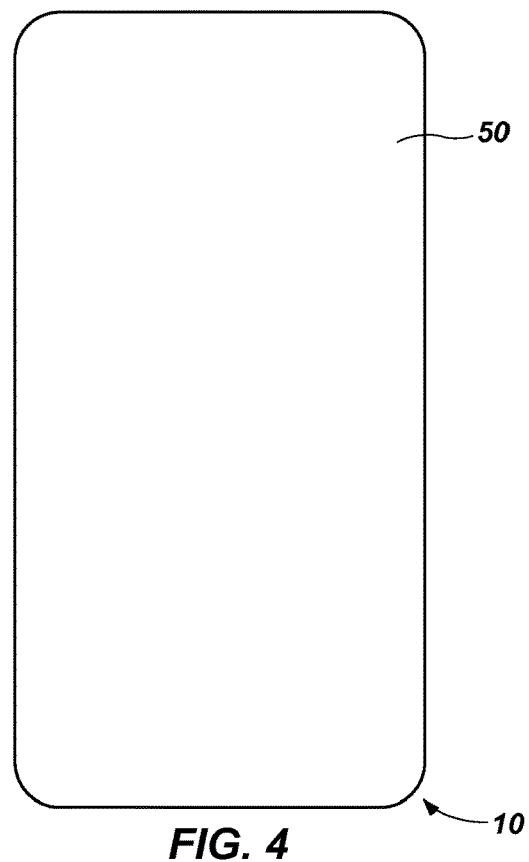
FIG. 1
FIG. 2
FIG. 5
FIG. 5A
FIG. 3
FIG. 4

PROTECTIVE LAYERS FOR DRY APPLICATION TO PROTECTED SURFACES, INSTALLATION ASSEMBLIES AND KITS INCLUDING THE LAYERS, DEVICES PROTECTED WITH THE LAYERS, AND ASSOCIATED METHODS

This application claims priority under 35 U.S.C. 119(e) to U.S. provisional application No. 61/357,427 filed Jun. 22, 2011, entitled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS, and to U.S. provisional application No. 61/357,972 filed Jun. 23, 2011, entitled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS, the entire disclosures of each of which are, by this reference, hereby incorporated herein.

TECHNICAL FIELD

The present invention relates generally to films for protecting surfaces and, more specifically, to protective films that may be applied to surfaces that are to be protected, such as the surfaces of devices (e.g., electronic devices, etc.), using substantially dry processes. The present invention also relates to processes for manufacturing dry-apply protective films for application to surfaces that are to be protected and to methods for applying protective films to surfaces that are to be protected.

BACKGROUND OF RELATED ART

A variety of different types of films have been developed to protect surfaces that are prone to scratching, such as the monitors or displays of portable electronic devices, the crystals of watches, and the like. Such films include plastic films that electrostatically adhere to surfaces, films including surfaces that have been coated with pressure-sensitive adhesives, and films that are more permanently bonded to surfaces that are to be protected.

Electrostatically adhering films tend to peel away from the surfaces they are intended to protect, leaving the surface with an unsightly appearance and providing less-than-desirable protection.

Case-mate of Tucker, Ga., recently announced the launch of a protective film it calls GO BARE. The GO BARE protective film is coated with a pressure-sensitive adhesive. Case-mate refers to the adhesive-coated GO BARE protective film as "the first solution-free protective film." According to Case-mate's press releases, the GO BARE protective film purportedly provides "quick application—no sprays, no drying time—it's applied with your thumb and can be removed and manipulated." Further, Case-mate claims that applicators "have the option to apply, reapply, take off and manipulate the film as many times as needed."

Nonetheless, the GO BARE protective film is configured to be applied by a technique that results in the introduction of contaminants (oil, dirt, particulates, etc.) between the film and the surface that is to be protected. Specifically, one must grasp the edges of the GO BARE protective film to apply the same to a surface that is to be protected. Contamination of the edges of the GO BARE protective film and portions of its pressure-sensitive adhesive adjacent to the edges may result in protection that is not aesthetically pleasing. Moreover, the presence of contaminants on the pressure-sensitive adhesive may reduce adhesion of such a film to the surface it is intended to protect.

Immediately following installation upon a protected surface, an oily residue may present itself on an exterior surface of the GO BARE protective film. The oily residue resembles oils in a person's skin (e.g., the oils that may be left on a phone as a person talks on the phone, etc.) or a mineral oil. Although the residue may be removed, its removal presents an undesirable additional act in the application of the GO BARE protective film to a surface.

Moreover, the presence of the oily residue suggests that a fugitive plasticizer may be present in the pressure-sensitive adhesive that secures the GO BARE protective film to a protected surface. The inclusion of plasticizer in a pressure-sensitive adhesive increases its tack, but prevents repositioning of an improperly placed protective layer. Despite the increased tack imparted to the adhesive material by the plasticizer, the GO BARE protective film moves laterally shortly after its application. Moreover, the inclusion of plasticizer in a pressure-sensitive adhesive affects adhesion of the protective film to the protected surface in the long term. In particular, migration of plasticizer from the adhesive may cause the GO BARE protective film to peel away from a protected surface over time, particularly when applied to corners or curved surfaces.

Permanently bonded films provide aesthetics and protection that are superior to the aesthetics and protection provided by protective films that are secured to surfaces electrostatically or with a pressure-sensitive adhesive. Nonetheless, they are secured to the protected surface with chemicals that are initially wet. While the use of wet chemicals does not frequently, if ever, damage the device to which a protective film is permanently bonded, their use may void any warranty that covers a device, which may be problematic if the device fails for any other reason.

SUMMARY

The present invention, in one aspect, includes protective films that are configured to be applied to surfaces that are to be protected, including, but not limited to, the surfaces of electronic devices the crystals of watches, and other vulnerable surfaces that may benefit, aesthetically or otherwise, from protection. A protective film of the present invention may be configured to adhere to the surface that is to be protected without the use of a so-called "wet" adhesive. Thus, in various embodiments, an adhesion surface of a protective film of the present invention may be at least partially coated with an adhesive that includes pressure-sensitive properties. In addition to the adhesion surface, the protective film includes an exterior surface, which may be substantially free of adhesive.

A protective film of the present invention may be applied to one or more surfaces of a device (e.g., an electronic device, etc.), such as a surface through which information or images are visible (e.g., the surface of a monitor, or display or screen, that displays information or images, etc.). When configured for use over a surface through which information or images are to be viewed (e.g., over a monitor, or display or screen, of an electronic device, etc.) a protective film of the present invention may be transparent. Protective films that are configured for application to other surfaces, including surfaces through which information or images need not be viewed, may be transparent, translucent, or opaque, and may, in various embodiments, include one or more decorative features that enhance the look of a surface of a device to which they are to be applied.

In another aspect, the present invention includes installation assemblies that enable a protective film to be applied to a surface of a device with a pressure sensitive adhesive, or using a "dry-apply process," without diminishing the aesthetics of the surface to which the protective film is applied.

Broadly, an installation assembly of the present invention includes a polymer layer, which ultimately serves as the protective film on the surface of the device, and an application liner. The application liner is superimposed over an exterior surface of the polymer layer. A portion of the application liner, which is referred to herein as a "peripheral region" of the application liner, may extend laterally beyond an outer edge of the polymer layer. The peripheral region may be grasped by an individual to enable orientation and application of the polymer layer to a surface that is to be protected, while minimizing or eliminating the need to contact the polymer layer.

In a more specific embodiment, an installation assembly of the present invention includes a polymer layer; a release liner adjacent to an adhesion surface of the polymer layer; an intermediate, protective liner adjacent to an opposite, exterior surface of the polymer layer for protecting the exterior surface as the polymer layer is applied to a surface of a device; and an application liner adjacent to an opposite surface of the protective liner from the polymer layer.

The protective liner, which may be fully superimposed over the polymer layer, may have substantially the same lateral dimensions as the polymer layer. The protective liner may comprise a substantially transparent element. In some embodiments, the protective liner may bear indicia. The indicia on the protective liner may facilitate alignment of the protective liner and, thus, of the polymer layer over a surface of an electronic device. In addition or as an alternative to facilitating alignment, the indicia on the protective liner may also provide basic instructions on applying the polymer layer to the surface of the electronic device.

While the protective liner may have substantially the same lateral dimensions as the polymer layer, at least one dimension (e.g., length, width, etc.) of the application liner may exceed the corresponding dimensions of the protective liner and the polymer layer. Thus, a portion of the application liner, which is referred to herein as a "peripheral region," may extend laterally beyond corresponding edges of the protective liner and the polymer layer. Each peripheral region of the application liner that extends laterally beyond a corresponding edge of the protective liner and the polymer layer may be located adjacent to a corresponding portion of the release liner.

As suggested, an adhesive on the adhesion surface of the polymer layer may secure the adhesion layer to the release liner. Pressure-sensitive adhesives on adhesion surfaces of the protective liner may similarly secure the adhesion surfaces of the protective liner and the application liner to exterior surfaces of the polymer film and the protective liner, respectively. In addition, pressure-sensitive adhesives on portions of the adhesion surface of the application liner that extend laterally beyond the protective liner and the polymer layer may secure those portions of the application liner to the release liner.

The adhesion surface of each of the polymer layer, the protective liner, and the application liner may be configured to leave little or no adhesive residue on a surface to which it was previously secured. Thus, the adhesion surface of the application liner may be removed from the exterior surface of the protective liner with little or no adhesive residue remaining on the exterior surface of the protective liner. The adhesion surface of the protective liner may be similarly removed from the exterior surface of the polymer layer without leaving substantially any adhesive residue on the exterior surface of the polymer layer. The adhesion surface of the polymer layer may likewise be peeled away from the release liner or the surface of an electronic device with substantially no adhesive residue remaining on the release liner or the surface of the electronic device. Such selective adhesion may be accomplished in a variety of ways, including, but not limited to, selecting appropriate adhesive materials, configuring the adhesion surfaces of the polymer layer, the protective liner, and the application liner to retain the adhesive (e.g., with surface roughness or other characteristics, etc.) better the surfaces to which these elements will be applied, the process(es) by which the adhesive materials are applied to their respective adhesion surfaces, or in any other suitable manner.

In some embodiments, the adhesive material on the adhesion surface of the polymer layer may adhere more strongly than the adhesive material on the adhesion surface of the protective liner, and the adhesive material on the adhesion surface of the protective liner may have greater adhesive strength than the adhesive material on the application liner.

In addition to the foregoing, embodiments of installation assemblies with protective liners that are fully superimposed over and have substantially the same lateral dimensions as their corresponding polymer layers may additionally include removal tabs. A removal tab may comprise a film with an adhesion surface that is at least partially coated with an adhesive material. The adhesive material on the adhesion surface of a removal tab may adhere to the exterior surface of the protective liner with greater adhesive strength than that of the adhesive that secures the protective liner to the polymer layer. In some embodiments, the removal tab may initially be separate from the remainder of the assembly, with a release liner covering the adhesion surface of the removal tab.

Other embodiments of installation assemblies may include the release liner but lack the protective liner.

An installation assembly of the present invention may be manufactured under conditions that minimize or eliminate the presence of contaminants on the adhesion surface of the polymer layer, in the adhesive material that coats the adhesion surface of the polymer layer, and between the adhesion layer of the polymer layer and a surface protected by the polymer layer. In some embodiments, some or all of the manufacturing processes may be effected in a clean room environment, which may limit the number of contaminant particles that may be present on the adhesion surface of the polymer film or within the adhesive material carried by the polymer film.

The present invention also includes embodiments of methods for protecting a surface of a device, such as a surface of an electronic device. In such a method, an installation assembly with a portion of the application liner that extends laterally beyond a corresponding edge of the polymer layer may be positioned over the surface that is to be protected, with the corresponding edge of the polymer layer aligned over a corresponding feature (e.g., an edge of the surface, etc.) of the device. The exposed adhesion surface of that portion of the application liner may then be secured to the surface of the device, and pressure may be applied to portions of the application liner superimposed over the polymer layer to secure the polymer layer to the surface of the device. Pressure may be applied along a pressure front that extends across an entire dimension (e.g., width, etc.) of the polymer layer and move from one edge of the polymer layer to the other. The pressure front may be moved in a direction that extends away from the portion of the application liner that was initially secured to the device. Movement of the pressure front may be continuous. In a specific embodiment, the pressure front may be created with a rigid edge of a squeegee.

In embodiments where the installation assembly lacks a protective liner, further pressure fronts may be applied to the application liner from somewhat central locations over the polymer layer and moving over peripheral portions of the polymer layer, toward and over the edges of the polymer layer. The application of one or more pressure fronts in this manner removes air pockets, or bubbles, from between peripheral portions of the polymer layer and the surface to which the polymer layer has been secured. In a specific embodiment, a flexible surface of a squeegee may be used to remove air pockets, or bubbles, from between peripheral portions of the polymer layer and the surface to which the polymer layer has been applied, while minimizing damage to the polymer layer.

In other embodiments, i.e., those where the installation assembly includes a protective liner, the application liner may be removed from the exterior surface of the protective liner. Pressure fronts that originate at somewhat central locations over the polymer layer and move toward and over peripheral edges of the polymer layer may be applied to the protective liner to remove air pockets, or bubbles, from between peripheral portions of the polymer layer and the surface to which the polymer layer has been applied. In a specific embodiment, a rigid edge or a somewhat flexible, resilient edge of a squeegee may be used to apply pressure fronts to the protective liner. Once substantially all air pockets, or bubbles, have been removed from between the polymer layer and the surface, the protective liner may be removed from the polymer layer. In embodiments where the protective liner has substantially the same lateral dimensions as the polymer layer, an adhesively coated removal tab may be applied over an outer edge of the protective liner, secured to the protective liner, then pulled away from the device to enable removal (e.g., peeling away, etc.) of the protective liner from the polymer layer. Any remaining air pockets, or bubbles, may diminish over time as the polymer layer relaxes to substantially assume its original dimensions.

A kit of the present invention may include at least one installation assembly, a tool for applying a pressure front across the polymer layer of each installation assembly, and instructions for applying the polymer layer to a surface of a device, such as an electronic device. The pressure application tool of such a kit may comprise a squeegee. In some embodiments, the squeegee may include both a hard edge and a flexible, resilient edge. The hard edge may be configured for initial application of the polymer layer to the surface of the electronic device, while the flexible, resilient edge may be configured to enable the removal of air pockets, or bubbles, from peripheral portions of the polymer layer.

According to another aspect, the present invention includes devices, including, without limitation, electronic devices, with one or more surfaces that have been covered with a protective film. The protective film may comprise a dry-apply film that lacks air pockets, or bubbles, that are visible (e.g., to the naked eye, without image enhancement, etc.), and that has been applied by a process that will not void any warranty covering the device.

Other aspects, as well as features and advantages of various aspects, of the present invention will become apparent to those of ordinary skill in the art through consideration of the ensuing description, the accompanying drawings, and the appended claims.

BRIEF DESCRIPTION OF THE DRAWINGS

In the drawings:

FIG. 1 is a top view of an embodiment of a protective film of the present invention, which is configured for dry application to a surface of an electronic device;

FIG. 2 is a side view of the embodiment of protective film of FIG. 1;

FIG. 3 provides a top view of an embodiment of an installation assembly that includes a polymer layer comprising the protective film of FIGS. 1 and 2, as well as a release liner, a protective liner, and an application liner;

FIG. 4 is a bottom view of the embodiment of installation assembly shown in FIG. 3;

FIGS. 5 and 5A are respectively a side view and an enlarged, partial side view of the embodiment of installation assembly illustrated by FIGS. 3 and 4;

DETAILED DESCRIPTION

Figure 6:
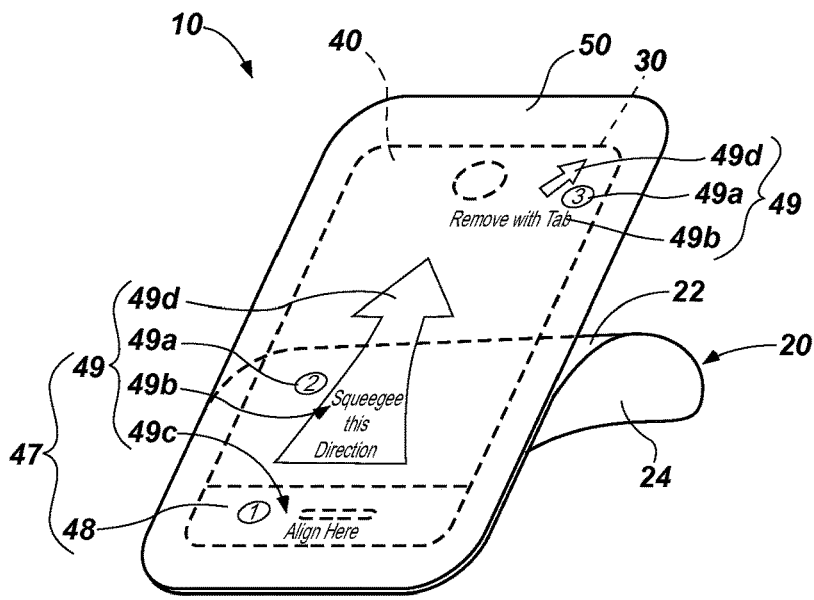
FIG. 6 shows the installation assembly of FIGS. 3-5 from which the release liner has been partially removed.

FIGS. 1 and 2 illustrate an embodiment of a dry-apply polymer layer 30 that incorporates teachings of the present invention. The dry-apply polymer layer 30 is also referred to herein as a "polymer layer" for the sake of simplicity, and as a "protective film" once it has been applied to an electronic device. The polymer layer 30 includes a substantially planar member with an exterior surface 32 and an opposite adhesion surface 34, which is configured to be secured to a surface of an electronic device. The adhesion surface 34 carries an adhesive material 36, which enables the polymer layer 30 to be secured to the surface of the electronic device by a so-called "dry-apply" process, which does not require the use of any "wet," or water-based, chemical solutions.

The polymer layer 30 may include one or more cut-outs extending from the exterior surface 32 to the adhesion surface 34. Each cut-out is defined by an edge of the polymer layer 30. In some embodiments, the edges of the polymer layer 30 that define each cut-out are internally confined. In other embodiments, outer edges 31 of the polymer layer 30 may define a cut-out. A cut-out may be configured (e.g., have a shape, position, orientation, etc.) to expose one or more features at the surface that is to be protected (e.g., a speaker, a microphone, a button, a camera lens, etc.).

The polymer layer 30 may be transparent, translucent, or opaque. The exterior surface 32 of the polymer layer 30 may be configured with a finish that appears (to the so-called "naked eye", without image enhancement, etc.) to be smooth (e.g., glossy, etc.), to have a matte finish, or to have any other desired texture. The exterior surface 32 of the polymer layer 30 may include features that provide privacy (e.g., only allow images to be viewed through the polymer layer 30 within a narrow range of angles around 90°, etc.). The exterior surface 32 may be reflective when viewed at certain angles. In some embodiments, the polymer layer 30 may include decorative features.

In some embodiments, the polymer layer 30 may include one or more layers. The material and thickness of each layer may be tailored to provide the polymer layer 30 with desired characteristics, or properties, as understood by those of skill in the art.

A variety of materials may be used to form the polymer layer 30. In a specific embodiment, the polymer layer 30 may comprise a polyurethane. A number of polyurethanes may provide desirable protective properties. In embodiments where the polymer layer 30 is transparent, some of these polyurethanes may also impart the polymer layer 30 with desirable optical properties (e.g., a clarity through which information or images may be viewed with little or no visible (to the naked eye, without image enhancement, etc.) distortion, etc.). For the sake of simplicity, the term "polyurethane," as used herein, includes polymers that include urethane, or "carbamate," linkages. A polyurethane may also include urea linkages, as well as combinations of urethane and urea linkages (e.g., poly(urethane-urea)s). Some polyurethanes that are useful for forming the polymer layer 30 include backbones in which at least about 80% of the linkages are urethane or urea linkages.

Examples of commercially available polyurethanes that may be used to form the polymer layer 30 include, but are not limited to, those marketed under the trade names KRYSTALFLEX® by Huntsman Corporation of Auburn Hills, Mich.; DURAFLEX® and TEXIN® (e.g., the aliphatic ester-based polyurethane sold as TEXIN® DP7-3008) by Bayer Material Science, LLC, of Pittsburgh, Pa.; ARGOTHANE™ by Argotec, Inc., of Greenfield, Mass.; and TECOFLEX® (e.g., CLA-93AV) by Lubrizol Corporation of Wickliffe, Ohio; as well as polyurethanes marketed by American Polyfilm, Inc., of Branford, Conn., and by Stevens Urethane of Easthampton, Mass. (e.g., the extrudable aliphatic polyurethanes designated SS-1219-92 and SS-2219-92).

In addition or as an alternative to a polyurethane, a polymer layer 30 of the present invention may include one or more of a polyvinyl chloride, a polyvinyl acetate, a polypropylene, a polyester, a poly(meth)acrylate, a polyethylene, and a rubbery resin (e.g., a silicone elastomer, etc.).

In some embodiments, the adhesive material on the adhesion surface 34 has a finish that appears (to the naked eye, without image enhancement, etc.) to be smooth (e.g., glossy, etc.).

The adhesive material 36 carried by the adhesion surface 34 of the polymer layer 30 may have any suitable thickness. In some embodiments, the adhesive material 36 may be applied to the adhesion surface 34 in a film that has a thickness of about 5 microns to about 150 microns or, even more specifically, of about 30 microns to about 100 microns.

The adhesive material 36 may substantially lack non-reacted reactive components, such as monomers. In embodiments where the polymer layer 30 is transparent, the exclusion of reactive components from the adhesive layer 36 may impart the adhesive material 36 with optical clarity and, thus, minimize distortion of images that may be viewed through the transparent polymer layer 30.

The adhesive material 36 may lack components, such as plasticizers, that may migrate from the adhesive material 36 and reduce adhesion of the polymer layer 30 to a surface that is to be protected.

In some embodiments, the adhesive material 36 may comprise a pressure-sensitive adhesive. Examples of pressure-sensitive adhesives that may be used as the adhesive material 36 include, but are not limited to, (meth)acrylates (e.g., acrylates, methacrylate, etc.), as well as adhesives that include chemistries based on natural and synthetic rubbers, polybutadiene and copolymers thereof, polyisoprene and copolymers thereof, and silicones (e.g., polydimethylsiloxane, polymethylphenylsiloxane, etc.). In a particular embodiment, the adhesive material 36 may include 2-ethyl hexyl acrylate, vinyl acetate, and polymerized acrylic acid monomers. Such an adhesive material is available from entrochem, inc., of Columbus, Ohio, under trade name ENTROCHEM™ -ECA 340.

In other embodiments, the adhesive material 36 may include a heat-activated or a pressure-activated adhesive material.

The adhesive material 36 may also include one or more additives. Examples of additives include, but are not limited to, cross-linking agents (e.g., aluminum cross-linkers, melamine cross-linkers, etc.).

Turning now to FIGS. 3-5, an embodiment of an installation assembly 10 is depicted that includes a polymer layer 30 of the present invention. In addition, the installation assembly 10 includes a release liner 20, a protective liner 40, and an application liner 50. In sequence from an adhesion surface 14 (FIG. 5) of the installation assembly 10 to an opposite application surface 12 (FIG. 5), the installation assembly 10 includes the release liner 20, the polymer layer 30, the protective liner 40, and the application liner 50. More specifically, adhesion surfaces 34, 44, and 54 of the polymer layer 30, the protective liner 40 and the application liner 50, respectively, are secured, in sequence, by adhesive materials 36, 46, and 56 to an interior surface 22 of the release liner 20 and to exterior surfaces 32 and 42 of the polymer layer 30 and the protective layer 40.

In the depicted embodiment, the protective liner 40 is completely superimposed over the polymer layer 30 and has the same lateral dimensions or substantially the same lateral dimensions (i.e., within acceptable tolerances, with the exception of any protruding edges or tabs that facilitate removal of the protective liner 40 from the polymer layer 30, etc.) as the polymer layer 30. The application liner 50, in contrast, has at least one lateral dimension that exceeds a corresponding lateral dimension of the protective liner 40 and the polymer layer 30. Thus, the application liner 50 includes at least one peripheral region 58 (FIG. 3) that extends laterally beyond corresponding outer edges 41 and 31 of the protective liner 40 and the polymer layer 30, respectively. In the depicted embodiment, peripheral regions 51 of the application liner 50 extend laterally beyond each of the four outer edges 41 of the protective liner 40 and beyond each of the four outer edges 31 of the polymer layer 30. The release liner 20 may have the same lateral dimensions or substantially the same lateral dimensions (i.e., within acceptable tolerances, with the exception of any protruding edges or tabs that facilitate removal of the protective liner 40 from the polymer layer 30, etc.) as the application liner 50.

In such an embodiment, peripheral portions 55 of the adhesion surface 54 of the application liner 50 are exposed laterally beyond the protective liner 40 and the polymer layer 30. Thus, when the elements of the installation assembly 10 are assembled, the adhesion surface 34 of the polymer layer 30 and the peripheral portions 55 of the application liner 50 that are exposed laterally beyond the polymer layer 30 are secured to the interior surface 22 of the release liner 20. This arrangement protects the adhesive material 36 on the adhesion surface 34 of the polymer layer 30 during manufacture (e.g., as installation assemblies 10 are die cut, etc.), packaging, and storage of the installation assembly 10.

Now embodiments of the release liner 20, the protective liner 40, and the application liner 50 of an installation assembly 10 that incorporates teachings of the present invention will be described.

The release liner 20 of an installation assembly 10 may comprise a thin, flexible, substantially planar element with an interior surface 22 and an opposite exterior surface 24. The exterior surface 24 is configured to be located at the adhesion surface 14 of the installation assembly 10, while the interior surface 22 is configured to temporarily adhere to the adhesion surface 34 of the polymer layer 30 and to peripheral portions 55 of the adhesion surface 54 of the application liner 50. In a specific embodiment, the release liner 20 is formed from paper or a paper-like material (e.g., a sheet formed at least partially from polymer fibers, etc.). The interior surface 22 of the release liner 20 may have a smoothness that minimizes any adhesive material 36 residue thereon as the interior surface 22 is removed from adhesion surface 34 of the polymer layer 30. In some embodiments, such smoothness may be achieved by way of a polymer coating on the interior surface 22 of the release liner 20.

The protective liner 40 includes an adhesion surface 44, which carries adhesive material 46 and is configured to be temporarily secured to the exterior surface 32 of the polymer layer 30. The protective liner 40 is configured to prevent damage to the polymer layer 30 as the polymer layer 30 is secured to the surface of an electronic device. In some embodiments, including those where the polymer layer 30 comprises a transparent element for protecting the surface of a monitor, or display or screen, of the electronic device, the protective liner 40 may be configured to preserve the optical properties of the polymer layer 30 during application of the polymer layer 30 to the surface of the monitor, or display or screen.

In some embodiments, the protective liner 40 may have a thickness that absorbs and, optionally, distributes potentially damaging forces that may be applied to secure the polymer layer 30 to the surface of the electronic device. Alternatively, or in addition, the protective liner 40 may be formed from a material with a hardness that will absorb and/or distribute forces that may be applied to secure the polymer layer 30 to the surface of the electronic device, but could otherwise damage the polymer layer 30.

Although optional, when used, the protective liner 40 may comprise a material that may facilitate a differential release between the application liner 50 and the polymer layer 30. The inclusion of a protective liner 40 may be desirable when adhesion between the application liner 50 and the polymer layer 30 is stronger than adhesion between the polymer layer 30 and the surface that is to be protected.

In some embodiments, the protective liner 40 may comprise a rigid, but flexible, polymeric film. The use of a material that is harder than the material of the polymer layer 30 (e.g., harder than a Shore A hardness of about 90, etc.) may provide a desired balance of adhesion between adjacent layers of the installation assembly 10. In specific embodiments, the protective liner 40 may comprise a polyester or a polypropylene. Polyester and polypropylene films are available from a variety of vendors, including, without limitation, E.I. du Pont de Nemours and Co. of Wilmington, Del., and Exxon Mobil Corporation of Irving, Tex.

The adhesive material 46, when carried by the adhesion surface 44 of the protective liner 40 and secured to the exterior surface 32 of the polymer layer 30, may have an adhesive strength sufficient to enable the protective liner 40 to remain in place on the exterior surface 32 of the polymer layer 30 as the application liner 50 is removed from the exterior surface 42 of the protective liner 40. The adhesive strength of the adhesive material 46 on the adhesion surface 44 of the protective liner 40 may also enable removal of the protective liner 40 from the exterior surface 32 of the polymer layer 30 without overcoming the adhesive strength with which the adhesive material 36 on the adhesion surface 34 of the polymer layer 30 secures the polymer layer 30 to a surface of an electronic device. Thus, the protective liner 40 may be removed from the exterior surface 32 of the polymer layer 30 without pulling the adhesion surface 34 of the polymer layer 30 from the surface of the electronic device. In some embodiments, one or more of the adhesive material 46, the adhesion surface 44 of the protective liner 40, and the exterior surface 32 of the polymer layer 30 may be configured to enable removal of the protective liner 40 from the exterior surface 32 of the polymer layer 30 while leaving little or no residue of adhesive material 46 on the exterior surface 32.

The application liner 50 includes an adhesion surface 54, which carries adhesive material 56 and is configured to be temporarily secured to the exterior surface 42 of the protective liner 40. The application liner 50 is configured to facilitate alignment of the polymer layer 30 over a surface of an electronic device and to facilitate preliminary or initial adhesion of the polymer layer 30 to the surface of the electronic device. In this regard, the application liner 50 may comprise a relatively thin, flexible film of somewhat transparent material.

In a specific embodiment, the application liner 50 may comprise a film available from entrotech, inc., under the trade designation ENTROFILM™.

The adhesive material 56 on the application liner 50, when carried by the adhesion surface 54 of the application liner 50 and adhered to the exterior surface 42 of the protective liner 40, may have an adhesive strength that may enable the application liner 50 to be removed from the exterior surface 42 of the protective liner 40 without overcoming the adhesive strength with which the adhesive material 46 on the adhesion surface 44 of the protective liner 40 is secured to the exterior surface 32 of the polymer layer 30. Thus, the application liner 50 may be removed from the exterior surface 42 of the protective liner 40 without removing the adhesion surface 44 of the protective liner 40 from the exterior surface 32 of the polymer layer 30. The adhesive material 56, the adhesion surface 54 of the application liner 50, or the exterior surface 42 of the protective liner 40, the material from which the protective liner 40 is formed, or any combination of these features, may be configured to enable removal of the application liner 50 from the exterior surface 42 of the protective liner 40 while leaving little or no residue of adhesive material 56 on the exterior surface 42.

In a specific embodiment, an adhesive material available from entrotech, inc., under the trade name ENTROCHEM™ may be used as the adhesive material 56

In some embodiments, an installation assembly 10 according to the present invention may also include a release tab 70, which is configured to enable removal of the protective liner 40 from the polymer layer 30. The release tab 70, which may initially be separate from the remainder of the installation assembly 10, comprises a substantially planar, somewhat flexible element with an application surface 72 and an opposite adhesion surface 74. The adhesion surface 74 may carry an adhesive material 76. In addition, a backing element 78 may be disposed over the adhesion surface 74 of the release tab 70 and secured to the adhesion surface 74 with the adhesive material 76.

The adhesive material 76 may comprise a pressure-sensitive adhesive, or include a pressure-sensitive component, that will secure the release tab 70 to the exterior surface 42 of the protective liner 40 when the adhesion surface 74 of the release tab 70 is positioned against the exterior surface 42 of the protective liner 40 and sufficient pressure is applied to the application surface 72 of the release tab 70. As the release tab 70 is configured to enable removal of the protective liner 40 from the polymer layer 30, one or more of the adhesive material 76, the adhesion surface 74 by which the adhesive material 76 is carried, and the exterior surface 42 of the protective liner 40 may be configured to effectively impart the adhesive material 76 with an adhesion strength that exceeds the strength with which the adhesion surface 44 of the protective liner 40 is secured to the exterior surface 32 of the polymer layer 30. Conversely, the strength with which the adhesive material 76 secures the adhesion surface 74 of the release tab 70 to the exterior surface 42 of the protective liner 40 may be insufficient to overcome the strength with which the adhesive material 36 on the adhesion surface 34 of the polymer layer 30 secures the polymer layer 30 to a surface of an electronic device. Thus, the release tab 70 may enable removal of the protective liner 40 from the polymer layer 30 without enabling removal of the polymer layer 30 from the surface of the electronic device.

As shown in FIG. 6, in which the release liner 20 has been partially peeled away from the remainder of the installation assembly 10, some embodiments of the protective liner 40 may include indicia 47, which may be visible from the exterior surface 42 of the protective liner 40. The indicia 47 may include one or more alignment features 48, one or more instructional features 49, or any other features that may facilitate or enable proper application of the polymer layer 30 to the surface of an electronic device. In the illustrated embodiment, the indicia 47 include both an alignment feature 48 and instructional features 49a, 49b, 49c, and 49d (collectively, instructional features 49). More specifically, the illustrated alignment feature 48 facilitates positioning of a bottom edge of the protective liner 40 and the adjacent polymer layer 30 against a bottom edge of a surface of a monitor, or display or screen, of an electronic device to which the polymer layer 30 is to be secured, while the instructional features 49 include numbers 49a identifying the order in which various acts are to be carried out, or effected, as well as textual indicators 49b and 49c and graphical indicators 49d of the acts that are to be performed. In some embodiments, the indicia 47 may be the same color as the any underlying elements, which may reduce the visibility of the indicia 47 prior to use of the installation assembly 10 to secure the polymer layer 30 to the surface of an electronic device.

In other embodiments, indicia 47 may be included on the application liner 50 of an installation assembly 10 that incorporates teachings of the present invention.

Figure 7:
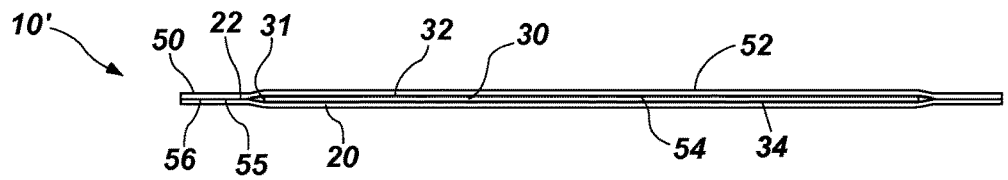
FIG. 7 is a side view of another embodiment of installation assembly that incorporates teachings of the present invention.

FIG. 7 illustrates an embodiment of installation assembly 10' that lacks a protective liner 40 (FIGS. 3-6). In such an embodiment, the adhesive material 56 on the adhesion surface 54 of the application liner 50, which is opposite from an exterior surface 52 of the application liner 50 secures the application liner 50 directly to the exterior surface 32 of the polymer layer 30. A release liner 20 covers the adhesion surface 34 of the polymer layer 30, as well as peripheral portions 55 of the adhesion surface 54 that are located laterally beyond outer edges 31 of the polymer layer 30, with an interior surface 22 of the release liner 20 facing the adhesion surface 34 of the polymer layer 30 and the peripheral portions 55 of the adhesion surface 54 of the application liner 50.

Regardless of whether an installation assembly 10, 10' (or any other embodiment of an installation assembly) that incorporates teachings of the present invention includes a protective liner 40, the additional application liner 50 protects the polymer layer 30 during handling, storage, shipping, and as the polymer layer 30 is applied to a surface that is to be protected.

An embodiment of a method for manufacturing an installation assembly 10 according to the present invention is illustrated in reference to FIGS. 8-12.

Separate rolls (not shown) of a release film 20', a polymer film 30', a protective film 40', and an application film 50' may be provided. Each of the polymer film 30', the protective film 40', and the application film 50' may include an adhesion surface 34, 44, and 54, respectively, onto which an adhesive material 36, 46, and 56, respectively, has been applied.

The release film 20' and the polymer film 30' may be formed in environments that are free of contaminants (e.g., dust, other particles, etc.) (e.g., in a clean room environment, such as an ISO class 5 clean room; in a cleaner environment, such as an ISO class 1 clean room; etc.). In other embodiments, an interior surface 22 of the release film 20' and an adhesion surface 34 of the polymer film 30' may be cleaned to remove any contaminants before an adhesive material 36 is applied to the adhesion surface 34 and secures the interior surface 22 to the adhesion surface 34.

The adhesive material 36 may also be manufactured in an environment that is free of contaminants, or it may be filtered to remove contaminants. The adhesive material 36 may then be applied to the adhesion surface 34 of the polymer film 30' in a contaminant-free environment. In specific embodiments, each cubic meter of adhesive material 36 may include, on average, no more than $10^5$ (i.e., 100,000) contaminant particles with dimensions of larger than 0.1 µm; fewer, on average, than 30 contaminant particles with dimensions of larger than 5 µm; on average, no more than ten (10) contaminant particles with dimensions of larger than 0.1 µm; or no more than an average of two contaminant particles with dimensions larger than 0.2 µm; etc.

In some embodiments, one or both of the protective film 40' and the application film 50' may also be contaminant free.

Figure 8:
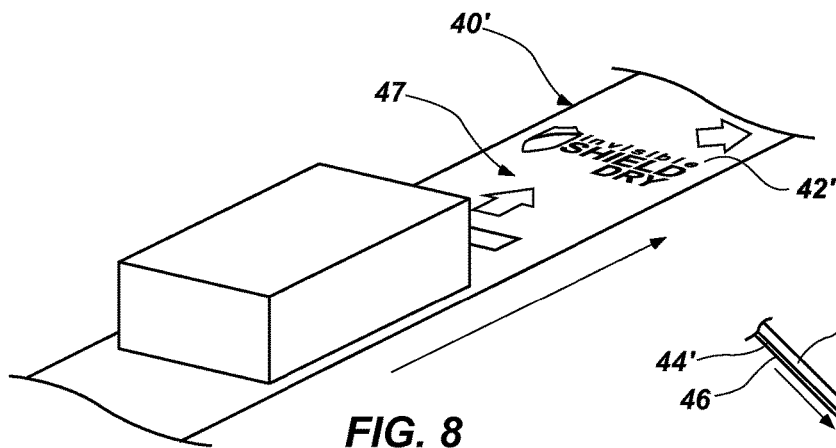
FIGS. 8-12 illustrate an embodiment of a process for manufacturing an embodiment of installation assembly, such as that shown in FIGS. 3-6.

Indicia 47 may be printed onto an exterior surface 42' of the protective film 40' in a suitable manner, as shown by FIG. 8.

Figure 9:
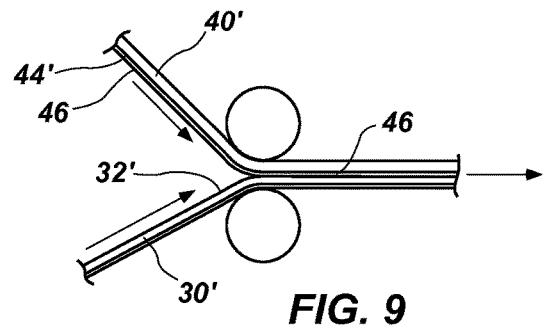

As illustrated by FIG. 9, the adhesion surface 44' of a protective film 40', from which the protective liner 40 of the installation assembly 10 (FIGS. 3-6) is formed, is brought into contact with, or at least in close proximity to, an exterior surface 32' of the polymer film 30', from which the polymer layer 30 and, ultimately, a protective film are formed. As the adhesion surface 44' and the exterior surface 32' are brought together, the adhesive material 46 on the adhesion surface 44' secures the protective film 40 to the exterior surface 42' of the protective film 40'.

Figure 10:
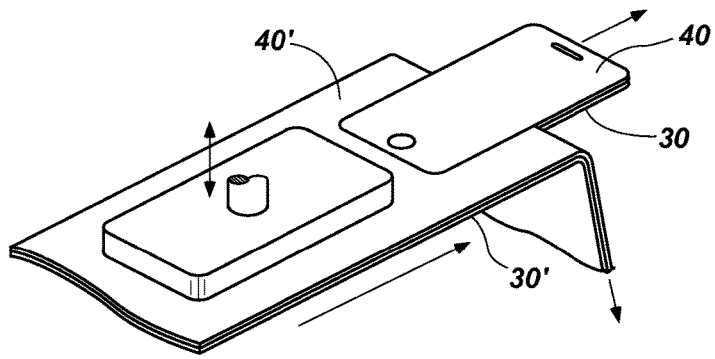

One or more polymer layer 30-protective liner 40 laminates may then be defined from the laminate of the polymer film 30' and the protective film 40', as illustrated by FIG. 10. Without limiting the scope of the present invention, the polymer film 30'-protective film 40' laminate may be die cut, with the resulting polymer layer 30 (and protective liner 40) having a desired configuration; e.g., a shape that is designed to protect a surface of a particular device.

Figure 11:
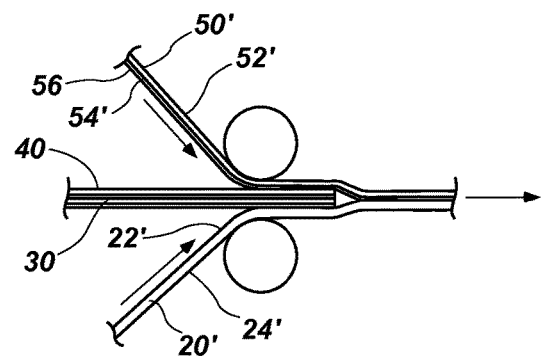

As shown in FIG. 11, each polymer layer 30-protective liner 40 laminate may be disposed between an interior surface 22' of the release film 20' and an opposed adhesive material 56-coated adhesion surface 54' of the application film 50'. As pressure is applied to opposite exterior surfaces 24' and 52' of the release film 20' and the application film 50', respectively, adhesive material 56 on the adhesion surface 54' of the application film 50' secures the adhesion surface to the exterior surface 42 of each protective liner 40 and to portions of the interior surface 22' of the release film 20' that are located laterally beyond the outer edges 31 and 41 of the polymer layer 30 and the protective liner 40, respectively. Thus, each polymer layer 30-protective liner 40 laminate is captured and secured in place between the release film 20' and the application film 50'.

Figure 12:
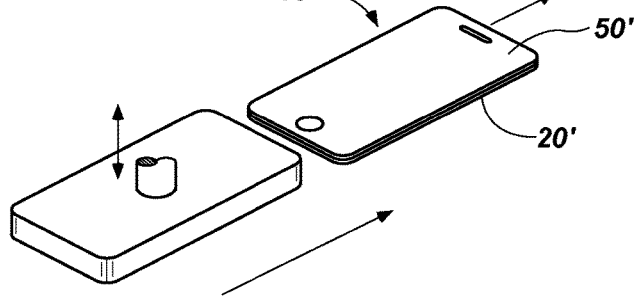

Thereafter, as illustrated by FIG. 12, the release film 20' and the application film 50' may be cut (e.g., die cut, etc.) to respectively define the release liner 20 and the application liner 50 of each installation assembly 10 (FIGS. 3-6).

Referring now to FIGS. 13-18, an embodiment of a method for protecting a surface 110 of an electronic device 100 is explained. Without limiting the scope of the present invention, the electronic device 100 may comprise a cellular telephone, a digital audio player, a tablet computer, an e-reader, a portable computer, a personal data (or digital) assistant, or the like.

Figure 13:
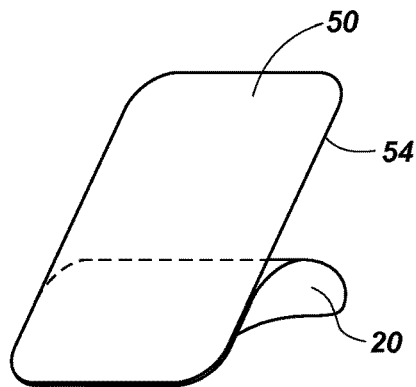
FIGS. 13-18 depict an embodiment of a method for installing a protective film on a surface of an electronic device using an embodiment of installation assembly such as that shown in FIGS. 3-6.

In FIG. 13, the release liner 20 is removed from the peripheral portions 55 (FIG. 5) of the adhesion surface 54 of the application liner 50 of an installation assembly 10, and from the adhesion surface 34 of the polymer layer 30 of the installation assembly 10 (FIG. 5A). In some embodiments, as shown in FIG. 6, indicia 47 may provide instructions on application of the polymer layer 30 to the surface 110 (FIG. 14) of the electronic device 100.

Figure 14:
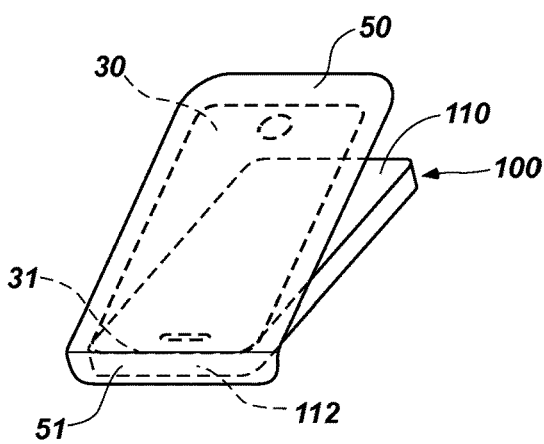

Next, as shown in FIG. 14, an outer edge 31 of the polymer layer 30 may be aligned with a corresponding feature (e.g., an edge of a surface 110, an edge of a monitor, or display or screen, etc.) on the surface 110 of the electronic device 100. With the polymer layer 30 properly aligned, a peripheral region 51 of the application liner 50, which peripheral region 51 is located laterally adjacent to the outer edge 31 of the polymer layer 30, may be secured to a corresponding location 112 (e.g. a bottom edge of the electronic device 100, as illustrated, etc.) adjacent to the surface 110 of the electronic device 100.

Figure 15A:
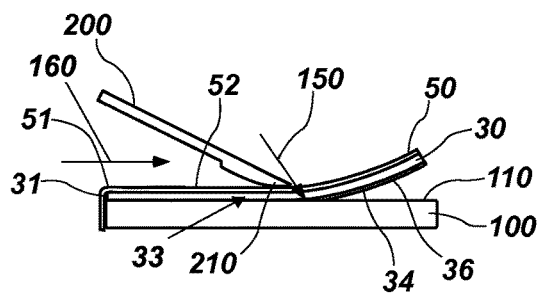
Figure 15B:
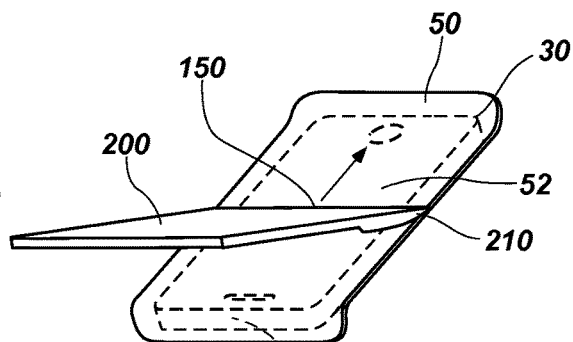

As depicted by FIGS. 15A and 15B, a pressure front 150 (e.g., including a physical force of about 360 g/cm$^2$, etc.) may be established at or just outside of the outer edge 31 of the polymer layer 30. In the depicted embodiment, the pressure front 150 is substantially linear, although the application of pressure fronts of other configurations (e.g., curved pressure fronts, chevron pressure fronts, etc.) are also within the scope of the present invention. The pressure front 150 may have a width that is substantially the same as or exceeds a corresponding dimension of the polymer layer 30. The pressure front 150 may be established by positioning an edge 210 of a pressure application element 200, such as the depicted squeegee, against the exterior surface 52 of the application liner 50 at the peripheral region 51. Once the pressure front 150 has been established, the pressure application element 200 may be moved in a direction 160 (FIG. 15A) transverse (e.g., perpendicular, substantially perpendicular (i.e., such that during linear movement, the pressure front 150 will completely cross a corresponding dimension of the polymer layer 30), etc.) to an orientation of the pressure front 150. The pressure applied at the pressure front 150 may be constant or substantially constant (i.e., sufficient to force the adhesive 36 on the adhesion surface 34 of the polymer layer 30 against the surface 110 of the electronic device 100, etc.). Movement of the pressure front 150 may be continuous or substantially continuous (i.e., varied rate of movement, but no stopping until the pressure front 150 has moved completely over the polymer layer 30). Such action may adhere the adhesion surface 34 of the polymer layer 30 to the surface 110 of the electronic device 100 while removing air gaps, or bubbles, including entrapped air, from between a central region 33 of the polymer layer 30 and the surface 110 of the electronic device 100.

Figure 16:
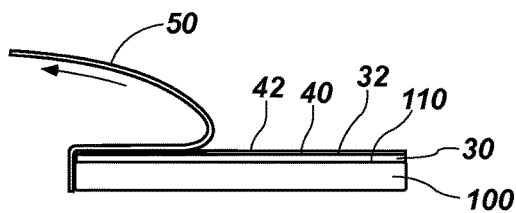
Figure 18:
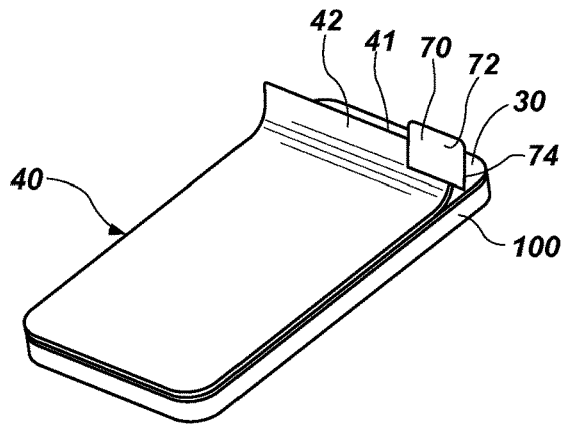

With the polymer layer 30 at least partially secured to the surface 110 of the electronic device 100, the application liner 50 may be removed from over the polymer layer 30, as shown in FIG. 16.

Figure 17:
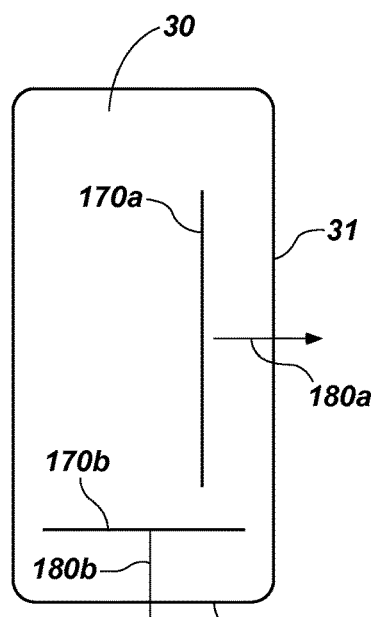

FIG. 17 illustrates an embodiment of the manner in which any additionally air gaps, or bubbles, between the polymer layer 30 and the surface 110 (FIG. 16) of the electronic device 100 to which the polymer layer 30 has been applied, including entrapped air, may be removed from locations that are adjacent to one or more outer edges 31 of the polymer layer 30. In particular, one or more pressure fronts 170a, 170b, etc., may be applied over the polymer layer 30 at locations between the central region 33 of the polymer layer 30 and outer edges 31 of the polymer layer. The pressure fronts 170a, 170b, etc., may be oriented parallel to or substantially parallel to corresponding outer edges 31 of the polymer layer 30, over which the pressure fronts 170a, 170b, etc., will move. Once established, each pressure front 170a, 170b, etc., may move in a direction 180a, 180b, etc., that extends from an initial position over the central region of the polymer layer 30 to a terminal position over or outside of the corresponding outer edge 31.

In embodiments where the installation assembly 10 includes a protective liner 40, the pressure fronts 170a, 170b, etc., may be applied after the application liner 50 has been removed (FIG. 16), in which case they may be applied directly to and move over the exterior surface 42 of the protective liner 40. Alternatively, the pressure fronts 170a, 170b, etc., may be applied to the exterior surface 52 of the application liner 50 (FIGS. 15A and 15B) prior to its removal from the exterior surface 42 of the protective liner 40.

In embodiments where an installation assembly 10' lacks a protective liner 40 (FIG. 7), the pressure fronts 170a, 170b, etc., may be applied to the exterior surface 52 of the application liner 50 (FIG. 7) prior to its removal from the exterior surface 32 (FIG. 7) of the polymer layer 30.

Once all or substantially all of the air gaps, or bubbles, have been removed from between the polymer layer 30 and the surface 110 of the electronic device 100, the protective liner 40, if any, may be removed from the exterior surface 32 of the polymer layer 30. In the embodiment shown in FIG. 18, removal of the protective liner 40 may be effected with a release tab 70 (see also FIG. 5). Specifically, a backing element 78 (FIG. 5) may be removed from the adhesion surface 74 of the release tab 70 to expose the adhesive material 76 on the adhesion surface 74. With the adhesive material 76 exposed, the release tab 70 may be positioned over the exterior surface 42 of the protective liner 40 at or near an outer edge 41 of the protective liner 40, then secured to the exterior surface 42 by applying pressure sufficient to the application surface 72 of the release tab 70. The release tab 70 may then be grasped and pulled away from the surface 110 of the electronic device 100, which also overcomes the strength with which the adhesive 46 on the protective liner 40 secures the adhesion surface 44 of the protective liner 40 to the exterior surface 32 of the polymer layer 30. Thus, as the release tab 70 is pulled away from the surface 110 of the electronic device 100, it pulls the protective liner 40 with it, removing the protective liner 40 from the exterior surface 32 of the polymer layer 30.

Figure 19:
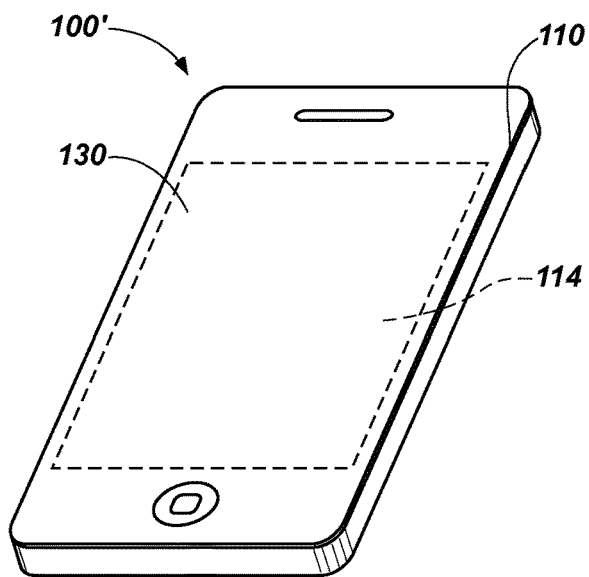
FIG. 19 shows an embodiment of an electronic device including a dry-apply protective film on at least one surface thereof.

An embodiment of the protected electronic device 100' is shown in FIG. 19. Specifically, the electronic device 100' includes a surface 110 that is covered by a protective film 130. The protective film 130 has been secured to the surface 110 using a dry apply process, which eliminates the need for wet adhesives that may otherwise void any warranty covering the electronic device 100'. In the depicted embodiment, the protective film 130 substantially covers a surface 110 through which a monitor 114, or display or screen, of the electronic device 100' is visible. The transparency of protective film 130 and the adhesive material 36 that secures the same to the surface, the lack of any contaminants within the adhesive material 36 or otherwise between the protective film 130 and the surface 110, the absence of any imperfections in the protective film 110 from the installation process, and the lack of any air voids, or bubbles, between the protective film 130 and the surface 110 optimize the aesthetics of the protective film 130 and enable distortion-free viewing of the monitor 114.

In the event that, with repeated use of the electronic device 100', one or more edges 131 of the protective film 130 peel away from the surface 100, the protective film 130 is scratched, or the protective film 130 otherwise gains an undesirable appearance, it may be peeled from the surface 100 and replaced with another protective film 130.

Other surfaces of the electronic device 100 may be covered with transparent, translucent, and/or opaque protective films in a manner consistent with teachings of the present invention.

As indicated previously herein, in some embodiments a tool, such as a squeegee, may be used to apply physical force to a to a polymer film 30 to remove air gaps, or bubbles from between the polymer film 30 and the surface 110 of device 100 (see, e.g., FIGS. 15A-17). The squeegee or other tool may be configured so that width of the surface used to apply the physical force meets or exceeds a width of the polymer layer 30. Such a configuration may facilitate application of substantially equal pressure across a dimension (e.g., a width, etc.) of the polymer layer 30 and, thus, may enable air gaps, or bubbles, to be efficiently removed from between the polymer layer 30 and the surface 110 to which the polymer layer 30 has been applied.

Figure 20A:
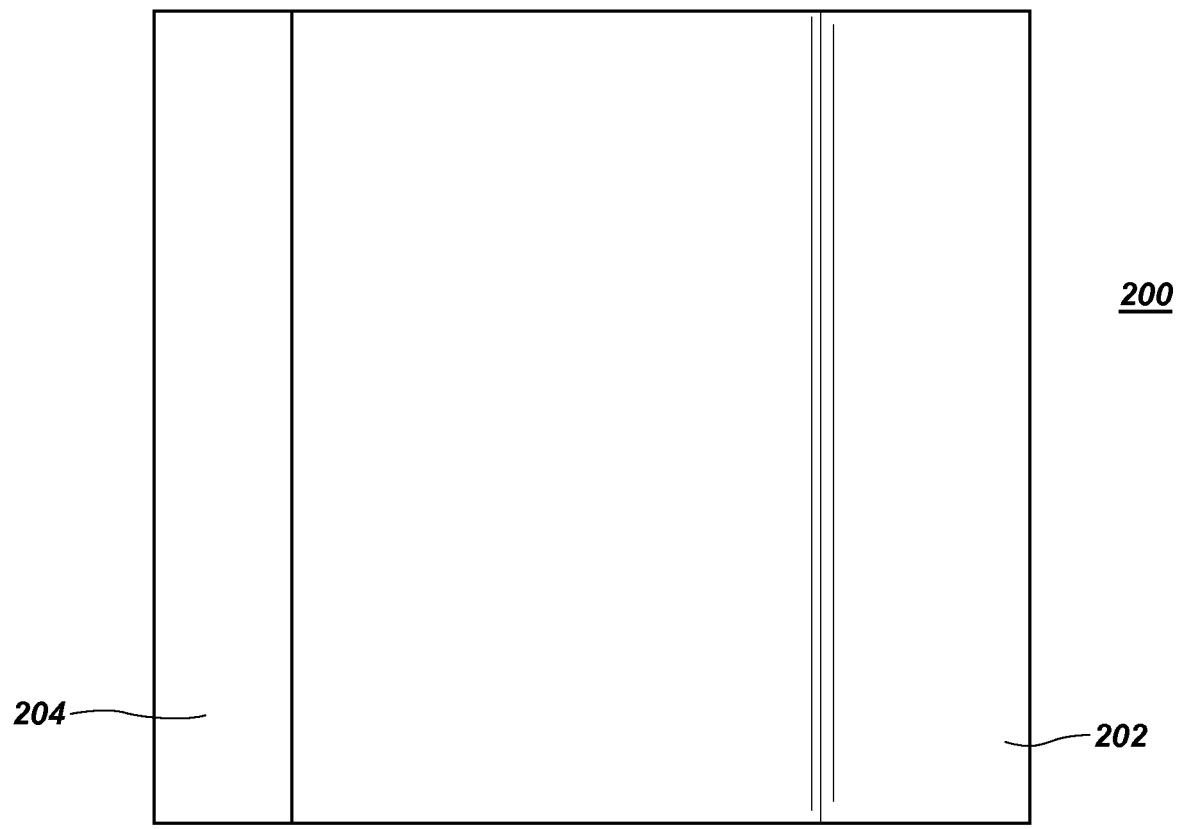
FIGS. 20A and 20B depict an embodiment of a tool for applying a pressure front to a polymer layer of an installation assembly to install the polymer layer on a surface that is to be protected.
Figure 20B:
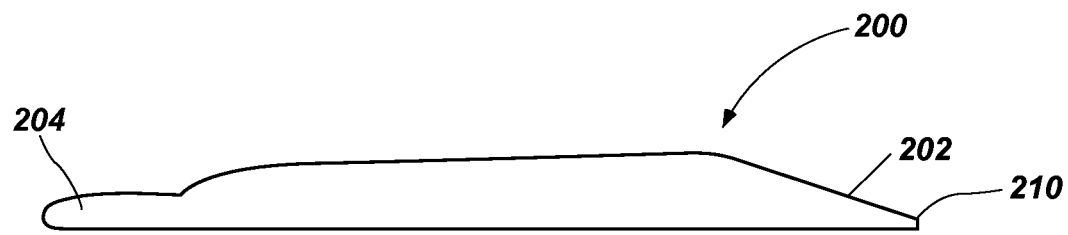

In one embodiment, shown in FIGS. 20A and 20B, a tool 200 may include a relatively rigid squeegee 202, which may be used to apply physical force over the polymer layer 30 (see, e.g., FIGS. 15A-17), as well as a relatively soft squeegee 204. In the depicted embodiment, the relatively rigid squeegee 202 and the relatively soft squeegee 204 are located at opposite ends of the tool 200.

The relatively rigid squeegee 202 may comprise any suitable material that flexes very little or does not flex in response to pressure (e.g., a force pressure of about 360 grams/cm$^2$, etc.) that may be manually applied as the polymer layer 30 (see, e.g., FIGS. 15A-17) is applied to the surface 110 that is to be protected. Examples of materials that may be used to form the relatively rigid squeegee 202 include polymers (e.g., nylon, etc.), metals, ceramics, and the like. The relatively rigid squeegee 202 may be used to provide an initial seal between the polymer layer 30 and the surface 110 to which the polymer layer 30 is applied.

The relatively soft squeegee 204 may comprise a flexible material. The material of the relatively soft squeegee 204 may be selected to enable further removal of air gaps, or bubbles, from between the surface of the polymer layer 30 and the surface to which the polymer layer 30 has been applied without causing significant damage (e.g., marks, scratches, physical deformations, etc.) to the polymer layer 30. Examples of such materials include, but are not limited to, lubricated elastomers, such as the polychloroprene sold by E.I. du Pont de Nemours and Company under the trade name NEOPRENE®.

The relatively soft squeegee 204 may be used to indirectly or directly apply pressure to the polymer layer 30 to eliminate any remaining entrapped air voids or bubbles (e.g., those at an outer periphery of the polymer layer 30, etc.) that may remain between the polymer layer 30 and the surface 110 to which the polymer layer 30 has been applied.

In a specific embodiment of a tool 200 that incorporates teachings of the present invention, the relatively rigid squeegee 202 may comprise nylon, while the relatively soft squeegee 204 may comprise a polychloroprene. To form such a tool 200, the polychloroprene may be co-molded to a portion of a nylon element.

According to another aspect, the present invention includes embodiments of kits for protecting surfaces. Such a kit includes an embodiment of an installation assembly (see, e.g., FIGS. 3-7 and accompanying text) and a tool (e.g., the tool 200 shown in and described with reference to FIG. 20) for applying pressure over the polymer layer of the installation assembly.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. An assembly for installing a protective layer on a surface to be protected, comprising:
   a polymer layer comprising a substantially planar member including an adhesion surface coated with a polymer layer adhesive material and an exterior surface not coated with an adhesive material, opposite the adhesion surface the polymer layer having a shape of a display of an electronic device, a material of the polymer layer enabling viewing of information or images shown by the display;
   a release liner including an exterior surface and an interior surface, the interior surface of the release liner secured to the polymer layer adhesive material, an entire outer periphery of the release liner extending laterally beyond an outer periphery of the polymer layer;

an application liner including an adhesion surface and an exterior surface, an entire outer periphery of the application liner extending laterally beyond an outer periphery of the polymer layer, coextensive with the entire outer periphery of the release liner, an application liner adhesive material removably securing the adhesion surface of the application liner over the exterior surface of the polymer layer and to portions of the interior surface of the release liner located laterally beyond the outer periphery of the polymer layer, the polymer layer and the release liner being visible through the application liner.

2. The assembly of claim 1, further comprising:
a protective liner comprising a substantially transparent element including an adhesion surface and an exterior surface opposite the adhesion surface, the protective liner superimposed over the polymer layer and located adjacent to a portion of the adhesion surface of the application liner, a protective liner adhesive material securing the adhesion surface of the protective liner to the exterior surface of the polymer layer, the protective liner being formed from a material having a thickness and/or a hardness that will absorb and distribute forces applied to the protective liner to protect the polymer layer while the polymer layer is secured to the surface of the electronic device, the hardness of the material of the protective liner exceeding a hardness of the material of the polymer layer.

3. The assembly of claim 2, wherein the application liner adhesive material secures the adhesion surface of the application liner to the exterior surface of the protective liner.

4. The assembly of claim 2, wherein at least one of the polymer layer adhesive material, the adhesion surface of the polymer layer, and the interior surface of the release liner enables the polymer layer to be removed from the interior surface of the release liner while leaving substantially no adhesive residue on the interior surface of the release liner.

5. The assembly of claim 2, wherein at least one of the polymer layer adhesive material and the adhesion surface of the polymer layer enables the polymer layer to be removed from a protected surface while leaving substantially no adhesive residue on the protected surface.

6. The assembly of claim 2, wherein at least one of the protective liner adhesive material, the adhesion surface of the protective liner, and the exterior surface of the polymer layer enables the protective liner to be removed from the exterior surface of the polymer layer while leaving substantially no adhesive residue on the exterior surface of the polymer layer.

7. The assembly of claim 2, wherein the protective liner provides a differential release between the application liner and the exterior surface of the polymer layer.

8. The assembly of claim 2, wherein a strength with which the polymer layer adhesive material will adhere the polymer layer to a protected surface exceeds a strength with which the protective liner adhesive material adheres the adhesion surface of the protective liner to the exterior surface of the polymer layer.

9. The assembly of claim 8, wherein the protective liner provides a differential release between the exterior surface of the polymer layer and the application liner.

10. The assembly of claim 2, wherein at least one of the protective liner and the application liner bears at least one indicium.

11. The assembly of claim 2, further comprising:
a release tab including an adhesion surface and an opposite application surface, the adhesion surface carrying a release tab adhesive material.

12. The assembly of claim 11, wherein the release tab enables removal of the protective liner from the polymer layer.

13. The assembly of claim 1, wherein the application liner adhesive material secures the adhesion surface of the application liner directly to the exterior surface of the polymer layer.

14. The assembly of claim 1, wherein, on average, fewer than $10^5$ contaminant particles with dimensions of larger than 0.1 μm and, on average, fewer than 30 contaminant particles with dimensions of larger than 5 μm are located between the adhesion surface of the polymer layer and the interior surface of the release layer.

15. The assembly of claim 1, wherein the polymer layer comprises a plurality of layers.

16. The assembly of claim 1, wherein the polymer layer adhesive material is substantially free of non-reacted reactive components.

17. The assembly of claim 16, wherein the non-reacted reactive components comprise monomers.

18. The assembly of claim 16, wherein the polymer layer adhesive material comprises 2-ethyl hexyl acrylate, vinyl acetate, and polymerized acrylic acid monomers.

19. The assembly of claim 1, wherein the polymer layer adhesive material includes an average of no more than $10^5$ contaminant particles with dimensions of larger than 0.1 μm per cubic meter.

20. The assembly of claim 1, further comprising a removal tab protruding from a peripheral edge of the assembly.

21. An assembly for installing a protective layer on a surface to be protected, comprising:
a polymer layer comprising a substantially planar member including an adhesion surface and an exterior surface opposite the adhesion surface, a polymer layer adhesive material on the adhesion surface of the polymer layer, the polymer layer having a shape of a display of an electronic device, a material of the polymer layer enabling viewing of information or images shown by the display;

a release liner including an exterior surface and an interior surface, the interior surface of the release liner secured to the polymer layer adhesive material, an entire outer periphery of the release liner extending laterally beyond an outer periphery of the polymer layer;

a protective liner comprising a substantially transparent element including an adhesion surface and an exterior surface opposite the adhesion surface, the protective liner having the shape of the display of the electronic device, the protective liner superimposed over the polymer layer, the protective liner being formed from a material having a thickness and/or a hardness that will absorb and distribute forces applied to the protective liner to protect the polymer layer while the polymer layer is secured to the surface of the electronic device, the hardness of the material of the protective liner exceeding a hardness of the material of the polymer layer, the polymer layer and the release liner being visible through the protective liner; and an application liner including an adhesion surface and an exterior surface, and an application liner adhesive material on the adhesion surface removably securing the adhesion surface to the exterior surface of the protective liner, over the exterior surface of the polymer layer and to a portion of the interior surface of the release liner located laterally beyond the outer periphery of the polymer layer, the protective liner, the polymer layer and the releaser liner being visible through the application liner.

22. The assembly of claim 21, wherein at least one of the polymer layer adhesive material, the adhesion surface of the polymer layer, and the interior surface of the release liner enables the polymer layer to be removed from the interior surface of the release liner while leaving substantially no adhesive residue on the interior surface of the release liner.

23. The assembly of claim 21, wherein at least one of the polymer layer adhesive material and the adhesion surface of the polymer layer enables the polymer layer to be removed from a protected surface while leaving substantially no adhesive residue on the protected surface.

24. The assembly of claim 21, wherein the protective liner further includes a protective liner adhesive material securing the adhesion surface of the protective liner to the exterior surface of the polymer layer.

25. The assembly of claim 24, wherein at least one of the protective liner adhesive material, the adhesion surface of the protective liner, and the exterior surface of the polymer layer enables the protective liner to be removed from the exterior surface of the polymer layer while leaving substantially no adhesive residue on the exterior surface of the polymer layer.

26. The assembly of claim 25, wherein the interior surface of the release liner enables the release liner to be removed from the adhesion surface of the polymer layer while leaving the polymer layer adhesive material on the adhesion surface of the polymer layer.

27. The assembly of claim 24, wherein a strength with which the polymer layer adhesive material will adhere the polymer layer to a protected surface exceeds a strength with which the protective liner adhesive material adheres the adhesion surface of the protective liner to the exterior surface of the polymer layer.

28. The assembly of claim 27, wherein the protective liner provides a differential release between the application liner and the exterior surface of the polymer layer.

29. The assembly of claim 25, wherein at least one of the polymer layer adhesive material and the adhesion surface of the polymer layer enables the polymer layer to be removed from a protected surface while leaving substantially no adhesive residue on the protected surface.

30. The assembly of claim 21, wherein the protective liner provides a differential release between the application liner and the exterior surface of the polymer layer.

31. The assembly of claim 21, wherein at least one of the protective liner and the application liner bears at least one indicium.

32. The assembly of claim 21, further comprising:
a release tab including an adhesion surface and an opposite application surface, the adhesion surface carrying a release tab adhesive material.

33. The assembly of claim 32, wherein the release tab enables removal of the protective liner from the polymer layer.

34. The assembly of claim 21, wherein, on average, fewer than $10^5$ contaminant particles with dimensions of larger than 0.1 µm and, on average, fewer than 30 contaminant particles with dimensions of larger than 5 µm are located between the adhesion surface of the polymer layer and the interior surface of the release layer.

35. An assembly for installing a protective layer on a surface to be protected, comprising:

a protective layer comprising a substantially planar member including an adhesion surface and an exterior surface opposite the adhesion surface, with a protective layer adhesive material on the adhesion surface, the exterior surface of the protective layer being non-adhesive, the protective layer having a shape of a display of an electronic device, a material of the protective layer enabling viewing of information or images shown by the display;

a release liner including an exterior surface and an interior surface, an entire outer periphery of the release liner extending beyond an outer periphery of the protective layer, the interior surface of the release liner secured to the adhesion surface of the protective layer with the protective layer adhesive material; and an application liner having an adhesion surface and an exterior surface, the application liner having substantially the same lateral dimensions as the release liner, an application liner adhesive material removably securing the adhesion surface of the application liner over the exterior surface of the protective layer and to a portion of the interior surface of the release liner located laterally beyond the outer periphery of the protective layer, portions of the application liner extending beyond the protective layer enabling grasping of the application liner and positioning of the protective layer over the display of the electronic device without contacting the protective layer, the protective layer and the display of the electronic device being visible through the application liner.

36. The assembly of claim 35, wherein a length of the release liner and a length of the application liner exceed a length of the protective layer.

37. The assembly of claim 35, wherein the release liner and the application liner extend beyond opposite edges of the protective layer.

38. The assembly of claim 35, wherein the release liner and the application liner are completely superimposed with one another.

39. The assembly of claim 35, further comprising:
a protective liner including a substantially transparent element with an adhesion surface and an opposite exterior surface, the protective liner superimposed over the protective layer and located adjacent to a portion of the adhesion surface of the application liner, the protective liner being formed from a material having a thickness and/or a hardness that will absorb and distribute forces applied to the protective liner to protect the protective layer while the protective layer is secured to the surface of the electronic device, the hardness of the material of the protective liner exceeding a hardness of the material of the protective layer.

40. The assembly of claim 39, wherein the protective liner further includes a protective liner adhesive material securing the adhesion surface of the protective liner to the exterior surface of the protective layer.

41. The assembly of claim 39, wherein lateral dimensions of the protective liner are substantially the same as corresponding lateral dimensions of the protective layer.

42. The assembly of claim 41, wherein the protective liner and the protective layer are completely superimposed with one another.

43. The assembly of claim 35, wherein the protective layer comprises a plurality of layers.

44. The assembly of claim 35, wherein the protective layer adhesive material comprises 2-ethyl hexyl acrylate, vinyl acetate, and polymerized acrylic acid monomers and substantially lacks unreacted reactive species, including monomers.

45. The assembly of claim 35, wherein the protective layer adhesive material includes an average of no more than $10^5$ contaminant particles with dimensions of larger than 0.1 µm per cubic meter.

46. The assembly of claim 35, further comprising a removal tab protruding from a peripheral edge of the assembly.

* * * * *